United States Patent

Parkinson et al.

[11] 3,841,259
[45] Oct. 15, 1974

[54] DIFFERENTIAL PRESSURE INDICATOR

[75] Inventors: John Parkinson, Newark; Alfred Eibich, Parsippany; Thomas T. Ronald, Essex fells, all of N.J.

[73] Assignee: Parmatic, Inc., Livingston, N.J.

[22] Filed: June 21, 1971

[21] Appl. No.: 154,835

[52] U.S. Cl. .................................. 116/70, 210/90
[51] Int. Cl. ........................................... G01l 19/12
[58] Field of Search ............ 116/65, 70; 210/85, 90

[56] References Cited
UNITED STATES PATENTS

| | | |
|---|---|---|
| 3,442,248 | 5/1969 | Parkinson et al. .................... 116/70 |
| 3,499,415 | 3/1970 | Gutkowski ............................ 116/70 |

*Primary Examiner*—Louis J. Capozi
*Attorney, Agent, or Firm*—Auslander & Thomas

[57] ABSTRACT

A differential pressure indicator enabled to actuate electrical signals has a floating collar holding the magnetically attractable substance to the button. The magnet is of reduced diameter and able to expend more magnetic mass to hold the button strongly. The piston accommodates the magnetic diameter to start enough magnetic flux to release the button.

7 Claims, 7 Drawing Figures

Inventors:
John Parkinson
Alfred Eibich
Thomas T. Ronald

By: Auslander + Thomas
Attorneys:

DIFFERENTIAL PRESSURE INDICATOR

The present invention releates to an improved differential pressure indicator of the type disclosed in U. S. Pat. No. 3,442,248.

In U. S. Pat. No. 3,442,248 is set forth among other things, a differential pressure indicator wherein a mechanical visual signal is actuated by the changing of magnetic flux allowing release of the indicator button.

Differential pressure indicators are often employed for aerospace uses where low weight and size and high performance are requried in an environment often reaching many g. 's.

According to the present invention, a differential pressure indicator is provided with more magnetic flux concentratable in substantially the same space as differential pressure indicators of the past, and able to withstand very high g. stress without false actuation. The differential pressure indicator is also adapted to give a selected signal either mechanical, electrical or combined.

The improvements of the present invention are brought about by the magnet and piston configurations and enhanced by the adaptability of the magnetically attractable portion of the indicator button to get a full grip of the magnet and a careful control of the mass of the release button construction.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
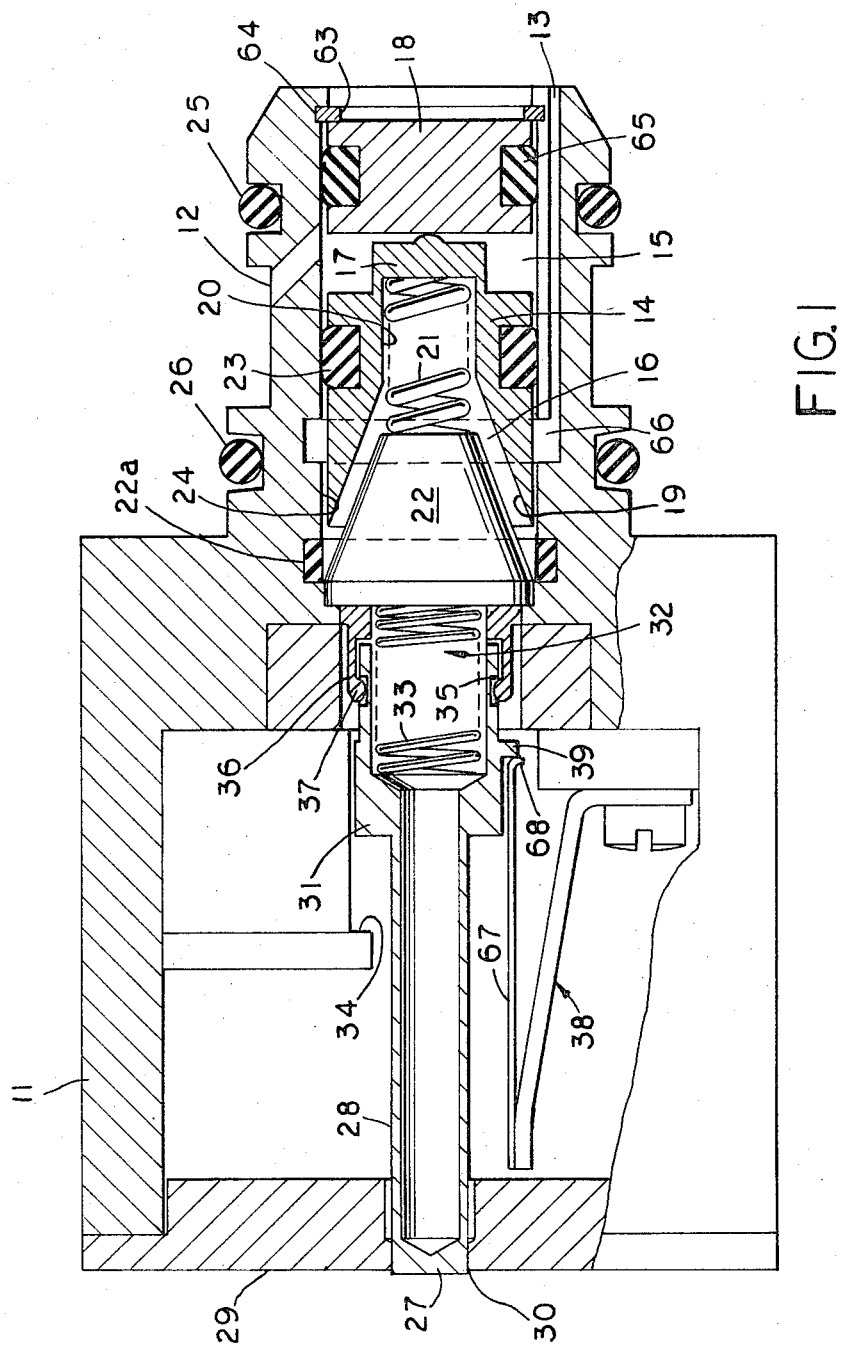
FIG. 1 is a partial section of the differential pressure indicator of the present invention.

The differential pressure indicator 10 as shown in FIG. 1 is contained in a housing 11 which may be mounted in a fluid system with an opening 12 opening to a normally high pressure source with another opening 13 opening to a normally lower pressure source. The openings 12, 13 are arranged so that a mounted differential pressure indicator 10 of the present invention has no leakage or crossover between the openings 12, 13. There, of course, should not be any leakage about the walls of the piston 14 from either normally high pressure chamber 15 or the normally lower pressure chamber 16.

The piston 14 has a spacer 17 which normally abuts the plug 18 which defines one end of the normally high pressure chamber 15. The inside hollow 19 of the piston 14 includes a recess 20 which supports the expansion spring 21, biased between the conical magnet 22 and the piston 14.

A fluid light seal 22a holds the magnet 22 in the chamber 16 safe from fluid leakage. The chambers 15, 16 are sealed from fluid leakage by the O-ring seal 23 between the piston 14 and the channel 24 in the housing 11 which houses the chamber 15, 16 assembly.

O-rings 25, 26 are provided to seal the differential pressure indicator 10 against fluid system leakage when engaging in a proper mount.

The release button 27 is preferably hollow and may have a hollow narrow shank 28 extending to the cover 29, engaged in an opening 30 from whence it can protrude when actuated.

The lower portion 31 of the release button 27 is preferably hollow and may be of a wider diameter than the narrow indicator shank 28. The lower portion 31 includes a cavity 32 adapted to contain an expansion spring 33 which biases the button between the magnet 22 and the opening 30 and the stop 34 which retains the button 27 in the housing 11.

The lower portion 31 of the release button 27 includes a peripheral channel 35. A magnetically attractable collar 36 is attached to the release button 27 with some freedom of movement, having a narrower flange 37 engaged in the channel 35.

A thermostatic device 38 of a type well known in the art is engaged in the housing and when actuated, sustains the release button 27 from moving by holding it at the lip 39. The generally higher viscosity of cooled oils, for instance, may provide a high start up pressure which might ordinarily actuate a differential pressure indicator 10. When a system has reached operating temperature, the thermostat stop restraining the release button 27 is released.

The plug 18 closes the end of the channel 24 of the housing 11. The plug 18 is held firmly by a C ring 63 in a channel 64 in the end of the housing 11. Leakage of fluid from the high-pressure chamber through the plug is prevented by the sealing ring 65. The opening 13 admits low pressure fluid into the low pressure chamber 16. The low pressure chamber 16 constitutes the hollow area in the varaible space defined by the piston 14 through to the seal 22a. As fluid passes through the opening 13 into the low pressure chamber 16, it is circulated around the entire circumference of the low pressure chamber 16 by flowing through the channel 66, which is recessed into the walls of the low pressure chamber.

The piston 14 is hollowed out, forming a hollow recess 20, into which the spring 21 is placed, biasing itself between the piston 14 and the conical magnet 22.

The high pressure chamber 15 and the low pressure chamber 16 are all within the channel 24 inside the housing 11. The respective sizes of the high pressure chamber 15 and the low pressure chamber 16 vary with the differential pressure.

The piston 14 has a flared hollow portion 19, substantially conforming to the cone shape of the magnet 22.

The magnet 22 is fixed in the housing 11 between the piston 14 and the release button 27. Leakage of fluid through the channel 24 to the upper portion of the housing 11 is prevented by, among other things, the seal 22a.

The lower portion of the button 27 has a circumferential channel 35, into which the flange 37 of the magnetic collar 36 is loosely held, so that the magnetic collar can always be held free to move to a position flat against the magnet 22.

The thermostatic device 38 has a moveable arm 67, whose end 68 abuts the lip 39 of the lower portion 31 of the button 27 when the differential pressure indicator is cold. Thus, the button 27 is held in place against the biasing of the expansion spring 33 by the thermostatic arm 67.

Figure 2:
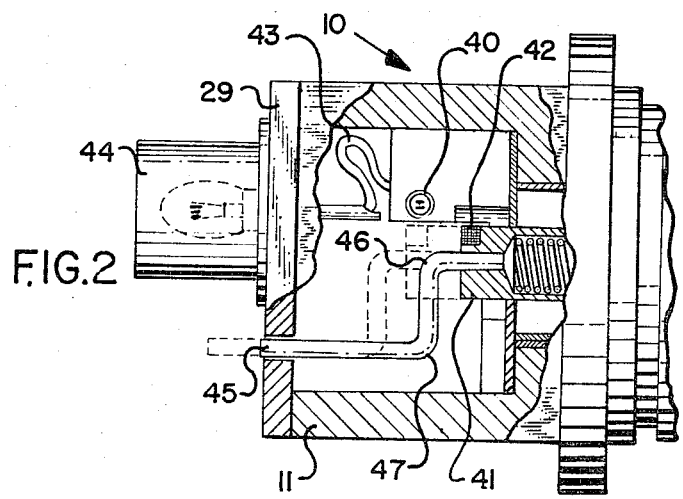
FIG. 2 is a partial section of a variant differential pressure indicator of the present invention with a reed switch actuated light and variant mechanical indicator.

The differential pressure indicator 10, as shown in FIG. 2 may also, upon giving a mechanical signal, close an electric circuit to give a selected electronic response, such as a light, a horn, or to actuate a relay, for instance. The circuit is controlled by a reed switch 40 held in the housing 11. When the button 41 is released, a magnet 42 is juxtaposed to the reed switch 40, in this case, actuating a light circuit 43, turning on the light 44 at the same time the button end 45 gives a mechanical visual signal. The button end 45 as shown in FIG. 2 is provided with two elbow bends 46, 47 so that it can protrude beyond the cover 29 without interference with the light 44.

Figure 4:
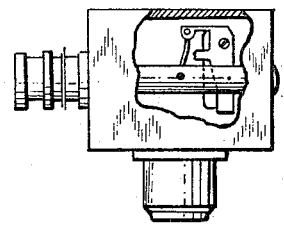
FIG. 4 is a cut-away view of a differential pressure indicator of the present invention.
Figure 4A:
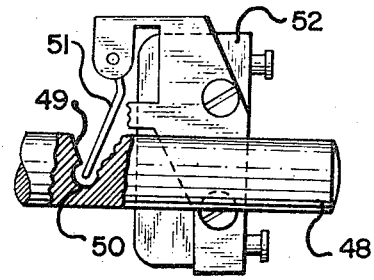
FIG. 4a is a detail of the microswitch actuator of the differential pressure indicator of the present invention.

The release button end shank 48, as shown in FIG. 4, has a flared declivity 49, ending in an open sided cylinder 50 into which the arm 51 of a microswitch 52 may be engaged and actuate the microswitch 52 to close a circuit when the button end shank 48 moves to its signal position.

Figure 5:
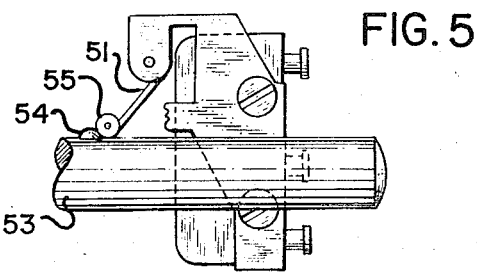
FIG. 5 is a detail of a cam microswitch actuator of the present invention.

In FIG. 5, the end shank 53 has a cam 54 to engage the arm 51 of a microswitch 52 to actuate switch 52. A roller 55 may be integral to the arm 51 to facilitate movement of the arm 51.

Figure 6:
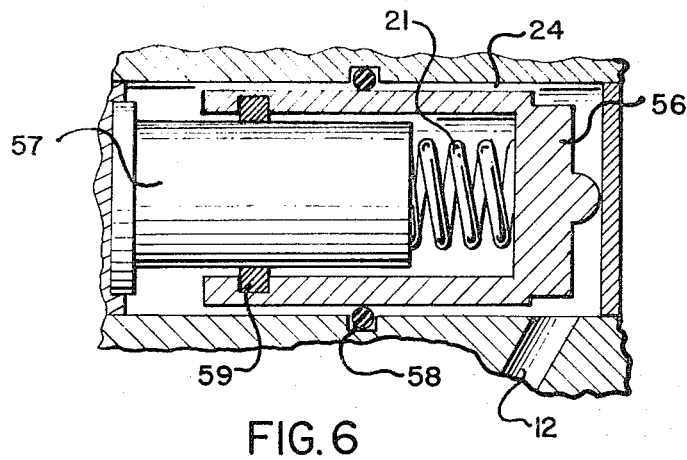
FIG. 6 is an alternate magnet and piston configuration of the present invention.

In FIG. 6 an alternate piston 56 configuration is disclosed in combination with an elongated magnet 57. More magnetic flux may be concentrated in the larger mass of the cylindrical magnet 57. The hollow piston 56 can attract the greater flux of the cylindrical magnet 57 to release the indicator button 27 (not shown in the Fig.)

O-ring 58 seals the piston 56 fluid tight into the channel 24 and internal sealing washer 59 keeps fluid out of the space between the piston 56 and magnet 57.

Figure 3:
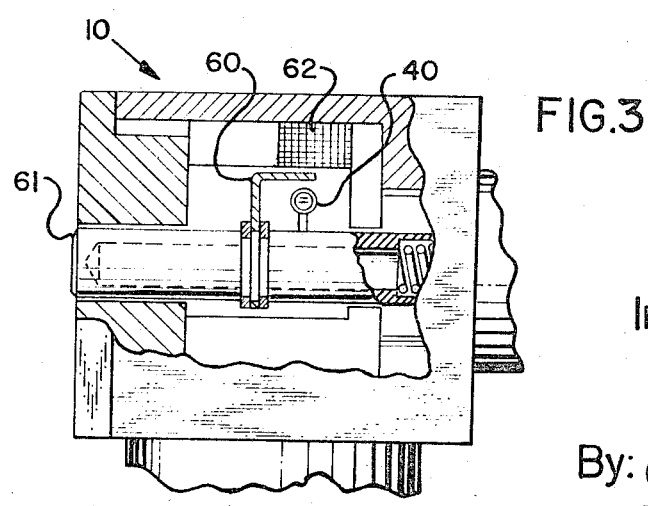
FIG. 3 is a detail section of a variant reed switch actuator of the present invention.

A variant means for actuating a reed switch 40 is shown in FIG. 3 where an L-shaped shield 60 is mounted on the indicator button 61 between the reed switch 40 and a magnet 62. When the button 61 is actuated, the shield 60 is withdrawn and the reed switch 40 is actuated.

The operation of the differential pressure indicator 10 of the present invention is substantially the same as the differential pressure indicator of the U.S. Pat. 3,442,248.

The purpose of the present invention is to obtain as much holding power of the release button 27 to the magnets 22, 57 to resist use vibration and g. force and avoid false indicator actuation.

The mass of the buttons 27, 45 are held down by either providing a hollow 28 or by decreasing the diameter of the button end shank 48.

The magnet 22, by its conical tapered configuration interfitting with the piston 14, is enabled to provide more magnet flux and have more mass space for space than a magnet of the prior art in the same size channel 24.

The tapering inside the piston 14 allows it to draw off the magnetic flux as high pressure entering through the opening 12 overcomes the back force of the spring 21 and low pressure entering the port 13 to allow the magnetically attractable part of the piston 14 to move and overlap the magnet 22, drawing off its magnetic flux and releasing the release button 27 when the grip between the magnet 22 and magnetically attractable collar 36 is insufficient to overpower the expansion spring 33.

An even greater magnetic mass in a small space is obtained when the magnet 57 is able to extend longitudinally within the channel 24 and interfits with a longitudinal cavity in the piston 56. Thus, more magnetic flux can be brought to bear on the collar 36 and this greater amount of magnetic flux can be diverted by the magnetically attractable substance in the cavity in piston 56. Generally, the entire piston 14, 56 is magnetically attractable.

Facilitating reliable functioning of the grip between the release button 27 and the magnets 22, 57 is the collar 36 which "floats" in the channel 35, held by the flange 37. The movability of the collar 36 within the channel 35 allows the collar 36 to adjust to get a full hold on the magnets 22, 57, even if the magnets 22, 57, or indicator buttons 27, 45 are misaligned for any reason. Any differential in alignment is automatically adjusted within the channel 35.

The terms and expressions which are employed are used as terms of description; it is recognized, though, that various modifications are possible.

Having thus described certain forms of the invention in some detail, what is claimed is:

1. In a differential pressure indicator for a fluid system including a moveable piston, said piston including a magnetically attractable substance, said piston and said magnetically attractable substance enclosed in said differential pressure indicator, a high pressure fluid inlet from the outside of said differential pressure indicator opening to one side of said piston, a low pressure fluid inlet between the outside of said differential pressure indicator opening into another side of said piston, sealing means between said piston and said differential high pressure and low pressure openings, said sealing means to inhibit the flow of fluid past said high pressure and low pressure side of said piston, a magnet in said differential pressure indicator having a surface outside the differential pressure indicator area of high pressure and low pressure fluid intake, a button including a magnetically attractable substance, said button adjacent said magnet's surface outside the differential pressure indicator's area of high pressure and low pressure fluid intake, means normally biasing said button away from said magnet, said button's magnetically attractable substance normally held to said magnet, said magnet including a longitudinal portion of lesser size than the inside of said differential pressure indicator's area of high pressure and low pressure fluid intake, said piston shaped to overlap said magnet's longitudinal position when said piston is urged by said fluid differential pressure towards said magnet, said piston then drawing off magnetic flux releasing said button from said magnet decreasing the magnetic flux to release the button against its biasing.

2. The invention of claim 1 including means between said piston and said magnet normally biasing said piston away from said magnet.

3. The invention of claim 1 wherein said longitudinal portion of said magnet is tapered.

4. The invention of claim 3 wherein said longitudinal portion of said magnet is conical 5. The invention of claim 3 wherein said longitudinal portion of said magnet is cylindrical.

6. The invention of claim 1 wherein a piston overlap is of a size to receive said magnet and surround at least part of said magnet.

7. The invention of claim 1 wherein said button includes an indentation at said end near said end near said magnet and a magnetically attractable substance flange moveably held in said indentation.

* * * * *